United States Patent
Bowen et al.

[11] Patent Number: 5,263,156
[45] Date of Patent: Nov. 16, 1993

[54] PARALLEL, DISTRIBUTED OPTIMISTIC CONCURRENCY CONTROL CERTIFICATION USING HARDWARE FILTERING

[75] Inventors: Thomas F. Bowen, Hopatcong; William H. Mansfield, Pittstown, both of N.J.

[73] Assignee: Bell Communications Research, Inc., Livingston, N.J.

[21] Appl. No.: 630,556

[22] Filed: Dec. 20, 1990

[51] Int. Cl.$^5$ .................... G06F 11/28; G06F 15/40
[52] U.S. Cl. ........................ 395/600; 395/575; 364/DIG. 1; 364/259.2; 364/282.1; 364/283.4; 364/285
[58] Field of Search ............... 395/600, 200, 575, 650, 395/725; 364/900, DIG. 1, DIG. 2

[56] References Cited

U.S. PATENT DOCUMENTS

| | | | |
|---|---|---|---|
| 4,183,086 | 1/1980 | Kober | 395/425 |
| 4,393,404 | 7/1983 | Cox et al. | 358/147 |
| 4,476,528 | 10/1984 | Matsumoto et al. | 364/200 |
| 4,480,304 | 10/1984 | Carr et al. | 364/200 |
| 4,600,921 | 7/1986 | Thomas | 340/825.31 |
| 4,627,019 | 12/1986 | Ng | 364/900 |
| 4,646,229 | 2/1987 | Boyle | 364/200 |
| 4,648,036 | 3/1987 | Gallant | 364/300 |
| 4,654,654 | 3/1987 | Butler et al. | 340/825.5 |
| 4,710,870 | 12/1987 | Blackwell et al. | 364/200 |
| 4,714,995 | 12/1987 | Materna et al. | 364/200 |
| 4,745,559 | 5/1988 | Willis et al. | 364/514 |
| 4,799,156 | 1/1989 | Shavit et al. | 364/401 |
| 4,811,166 | 11/1989 | Thompson et al. | 364/200 |
| 4,876,643 | 10/1989 | McNeill et al. | 364/200 |
| 5,050,075 | 9/1991 | Herman et al. | 395/600 |

OTHER PUBLICATIONS

Armand, J., "A Common File Approach to Data Processing", 1978, pp. 78–83.
"The Power of the Private Workspace Model", Israel Gold, Haran Boral, Inform. Systems vol. 11, No. 1, 1986, pp. 1–7, Great Britain.

*Primary Examiner*—Thomas C. Lee
*Assistant Examiner*—John C. Loomis
*Attorney, Agent, or Firm*—Leonard C. Suchyta; Loria B. Yeadon

[57] ABSTRACT

A method and system for determining a conflict in a database transaction processing system between a specific transaction and one or more other transactions utilizes a certification system (30). The certification system (30) comprises a memory (32) which contains a log of database activity. The log is periodically broadcast over a channel (42) to a plurality of filters (43) which determine if there are conflicts between particular transactions. The inventive system and method perform optimistic concurrency control in a database transaction processing system in a highly efficient manner.

8 Claims, 2 Drawing Sheets

PARALLEL, DISTRIBUTED OPTIMISTIC CONCURRENCY CONTROL CERTIFICATION USING HARDWARE FILTERING

RELATED APPLICATIONS

The following U.S. patent applications are assigned to the assignee hereof and contain subject matter related to the subject matter of the present application:

1. U.S. patent application Ser. No. 07/363,298, now U.S. Pat. No. 5,230,073 entitled "Architecture For A Storage Access System For High Performance Computer Systems" filed for E. J. Gausman, K. S. Grewal, and G. E. Herman on Jun. 6, 1989, now U.S. Pat. No. 5,230,073 issued July 20, abandoned, which is a continuation of U.S. application Ser. No. 06/888,733 filed on Jul. 21, 1986, now abandoned;

2. U.S. patent application Ser. No. 07/253,240, U.S. Pat. No. 5,050,075 entitled "A High Performance VLSI Data Filter" filed for Gary Herman, K. C. Lee, and Takako Matoba on Oct. 4, 1988, now U.S. Pat. No. 5,050,075, issued Sep. 17, 1991; and 3. U.S. patent application Ser. No. 630,557, entitled "System and Method for Updating Database Values Without Locks" filed for William H. Mansfield, Jr. and Thomas F. Bowen on even date herewith.

The contents of the above-identified related applications are incorporated herein by reference.

1. Field of the Invention

The present invention relates to a system and method for guaranteeing consistency in a database during transaction processing. More particularly, the present invention relates to a hardware based certification for optimistic concurrency control in a database transaction processing system. High levels of parallelism attained by using multiple parallel filters result in high levels of certification.

2. Background of the Invention

A database is defined as a collection of data values, organized according to a data model and accessed via a transaction comprising one or more database operations. The invention applies to any data model, but is illustrated using a relational database model.

In a relational database, which is also known as a relation, data values are organized in columns, with each column comprising one attribute of the relation. Each column or attribute of a relation has a domain which comprises the data values in that column. One row of a relation, which includes one value from each attribute, is known as a tuple or record.

Data values are accessed from a relation using selection operations. A select operation involves selecting those tuples of a relation R whose attribute A has a value which is equal to a specified constant C. This select operation is denoted $R.A = C$ or $S_{R.A=C}$. Operators other than equal such as "greater than", "less than" or "not equal" are allowed, as are combinations of operators that include AND and OR operators to build complex selections. A transaction that modifies, adds, or deletes tuples is called an update transaction. The set of selection operators is also known as the predicate that defines the selection.

A transaction is defined as a program that comprises database operations. If the database operations in a transaction only retrieve data the transaction is called a read-only transaction. The collection of tuples obtained through selects against the database is known as a transaction's read-set. The set of tuples modified, added, or deleted by a transaction is known as the transaction's write-set. In the write-set, modifies are expressed as delete/add couplets. The delete specifies the tuple prior to modification and the add specifies the tuple after modification.

A transaction is an atomic unit of work that is either completed in entirety or not done at all. An atomic transaction has multiple operations which delineate multiple transaction states. A begin operation marks the beginning of transaction execution. An end operation marks the end-execution point in the transaction and indicates that database changes are ready for permanent application to the database. A commit operation propagates a transaction's write-set to the database. A correct execution of a transaction must take the database from one consistent state to another. Transactions are designed such that if a transaction is executed completely and not interleaved with any other transactions, a consistent database state will result.

A database management system increases throughput by allowing interleaved execution of multiple transactions. Concurrency control is a mechanism that guarantees that the interleaved execution of concurrent transactions results in a consistent database state. It also guarantees that an atomic transaction receives data from and applies changes to a consistent database from the transaction's perspective. There are several techniques for performing concurrency control operations including locking, time stamp ordering, multiversion, and optimistic techniques. This invention deals with the optimistic concurrency control technique.

In an optimistic concurrency control technique, all transactions proceed without knowledge of intermediate changes to the database by other concurrent transactions. When a specific transaction commits, the database management system executes a certification process called a certifier to verify that the interleaved execution of the specific transaction with other transactions has not resulted in an inconsistent database state. If the certifier decides that the specific transaction's execution is acceptable, the specific transaction is completed normally. If the certifier decides that a transaction's execution is not acceptable, the specific transaction is aborted, which requires that all changes made by the transaction be undone.

Because undoing a transaction's changes is computationally costly, and may result in the abortion of other previously acceptable transactions, optimistic concurrency control is usually suitable only in conjunction with a private work space model. (See, e.g., Israel Gold, Haran Boral, "The Power of the Private Workspace Model," Inform. Systems Vol. 11, No. 1, 1986.) A private work space model provides for caching of database changes in a private database unique to the transaction. When a transaction commits, if its execution sequence is deemed acceptable by the certifier, the changes listed in its private database are propagated to the global database. Since changes from an unacceptable transaction are never installed in the global database, there is no need to undo them when the transaction commits.

To determine acceptability, the certifier needs to perform two distinct functions, conflict detection and serial equivalence checking. The present invention relates to conflict detection and is applicable to systems using a variety of serial equivalence checking methods.

Conflict detection, in general, comprises determining for two interleaved transactions $T_i$, which has already been installed, and $T_j$ which is being certified, if there is any tuple common to the read-set of $T_i$ and the write-set of $T_j$, the read-set of $T_j$ and the write-set of $T_i$, or the write-set of $T_i$ and the write-set of $T_j$. If there is a conflict, then the serial equivalence checker must determine if the conflict is acceptable. When the private workspace model is used in conjunction with optimistic concurrency control, conflicts between $T_i$'s read-set and $T_j$'s write-set can never cause a transaction to be unacceptable and thus need not be detected.

Consider a series of transactions $T_{n-m}, \ldots, T_{n-3}, T_{n-2}, T_{n-1}$, having an order which is determined by the commit time of each transaction. The next transaction to commit $T_n$, began its execution at some time during the execution of the earliest transaction in the sequence, $T_{n-m}$. Thus, all the transactions in the sequence $T_{n-m}, \ldots, T_{n-3}, T_{n-2}, T_{n-1}$ overlap $T_n$ in execution, either partially or fully. The certification process requires a methodology for detecting read-set and write-set conflicts between $T_n$ and any of the transactions $T_{n-m}, \ldots, T_{n-3}, T_{n-2}, T_{n-1}$.

Conflicts between two transactions do not always mean that one transaction must be aborted. The order of conflicting operations must be examined to determine if the resulting schedule is equivalent to a serial execution of the transactions. If the schedule is equivalent to a serial execution, both transactions can be accepted, otherwise one must be aborted. Thus there are two aspects of concurrency control, determining conflicts and checking for serial equivalence. All correct concurrency control techniques must detect conflicts. However, the computational complexity of determining serial equivalence is so great that most techniques relax the serial equivalence criteria such that some acceptable transactions may be unnecessarily aborted. An example of one such algorithm for concurrency control follows.

Three tests determine if a transaction $T_i$ can be successfully certified against a transaction $T_j$: 1) $T_j$'s write-set is installed in the database before $T_i$ performs its first select; 2) $T_i$ starts its write-phase after $T_j$ completes its write phase, and the read-set of $T_i$ has no conflicts with the write-set of $T_j$; and 3) both the read-set and the write-set of $T_i$ have no conflicts with the write-set of $T_j$, and $T_j$ completes its read phase before $T_i$ completes its read phase. If any one of these conditions is true, there is no conflict between transactions $T_i$ and $T_j$. If none of the above conditions hold, the certification process of transaction $T_i$ is said to fail. These rules may cause certification of some acceptable transactions to fail; however, they will never cause acceptance of unacceptable transactions In the certification process, a log, or list of database changes is maintained. Tuples in the log are formed from the tuples in the read and write-sets in the transactions $T_{n-1}, T_{n-2}, T_{n-3}, \ldots, T_{n-m}$ and a time-stamp indicating when the read and write operations were completed When a transaction Tn commits, its read-sets and write-sets are compared to the log to determine if write-sets that were applied to the database by other transactions $T_{n-1}, T_{n-2}, T_{n-3} \ldots T_{n-m}$ during the execution of the transaction $T_n$ conflict with transaction $T_n$'s read-sets and write-sets. If a conflict occurs, appropriate steps are taken to ensure that the database remains consistent.

The above-identified U.S. patent applications Ser. No. 07/363,298, now U.S. Pat. No. 5,230,073 issued Jul. 20, 1993, and Ser. No. 07/253,240, now U.S. Pat. No. 5,050,075 issued Sep. 17, 1991 describe a unique system for accessing a database such as a relational database. In this database access system the contents of the database is cyclically broadcast over a communications channel at a high bit rate. A plurality of filters are located along the communications channel and "listen" to the broadcast bit stream to select certain data from the bit stream. In particular, the filters apply relational selection predicates or unique tuple identifiers against the individual tuples in the broadcast database and evaluate each tuple on the fly to determine if it meets the selection criteria. If a tuple meets the selection criteria applied by a specific filter it is retrieved from the broadcast bit stream by the specific filter.

It is an object of the present invention to utilize the above-described unique database access system to perform certifications for optimistic concurrency control in a transaction processing database system. In particular, it is an object of the present invention to utilize the above-described unique database access system to perform the conflict detection part of a certification process with a very high level of efficiency.

SUMMARY OF THE INVENTION

The present invention is a system and method for performing the conflict detection part in an optimistic concurrency control certification operation. In accordance with an illustrative embodiment of the present invention, a general purpose computer for executing database transactions is in communication with a certification system for certifying transactions executed by the general purpose computer. The certification system comprises a memory and a certification processor having read and write access to the memory. The certification system also includes a transmitter for cyclically broadcasting the contents of the memory over a communications channel. A plurality of filters interface with the communications channel, and in response to instructions loaded into the filters from the certification system processor, the filters select certain data from the bit stream broadcast from the memory over the communications channel.

The certification system is utilized to determine if there is a conflict between a specific transaction running on the general purpose computer and one or more other transactions whose execution overlaps the execution of the specific transaction. To determine if there is such a conflict, the certification system memory stores a log of relational database tuples comprising the read-set and write-set of the other transactions. At the commit time of the specific transaction, the relational database tuples comprising read-set and write-set of the specific transaction are sent from the general purpose computer to the certification processor and added by the certification processor to the log maintained in the memory. The certification processor also transmits to a specific one of the filters interfacing the communications channel selection criteria for identifying the read-set and write-set of the specific transaction. Generally, the selection criteria for the write-set is in the form of unique tuple identifiers while the selection criteria for the read-set may be in the form of unique tuple identifiers or selection predicates.

The contents of the log are cyclically broadcast over the communications channel. During a broadcast cycle of the log, the specific filter selects from the log those tuples meeting the selection criteria of that specific filter. The filter will always select from the log the read-set and write-set of the specific transaction. However, if there is a conflict the filter will also select from the log additional tuples not belonging to the read-set and write-set of the specific transaction.

If a conflict is detected, the certification system processor executes a standard serial equivalence determination algorithm to determine if the conflict is acceptable. If the serial equivalence algorithm determines that the conflict is not acceptable, the certification system processor communicates with the general purpose computer to abort the specific transaction.

In an alternative embodiment of the invention, the log maintained in the certification system processor includes only the write-sets of the transactions. In this case significantly less information is maintained in the log thereby simplifying log maintenance. In addition, the broadcast cycles of the log are shorter so that the response time of the certification system to certification requests is shorter. While this embodiment of the invention aborts some transactions unnecessarily, it does maintain database consistency.

It is an important advantage of the present invention that both predicate-based and record-based conflict detection may be utilized. When record based conflict detection is utilized, the read-set selection criteria contained in the filter is in the form of unique tuple identifiers, and these identifiers are compared with tuples in the broadcast bit stream. When predicate-based detection is utilized, the selection criteria contained in the filter is in the form of a selection predicate and conflict detection involves comparison of the selection predicate with the tuples in the broadcast bit stream. The certification system in the present invention allows both types of conflict detection in a highly efficient manner.

It is also a significant advantage of the certification system of the present invention that a plurality of filters interface to the communications channel so that a plurality of certifications can be performed in parallel, thereby increasing the certification rate.

Finally, when the log is broadcast over long distance high-speed communications such as optical fiber transmission facilities, the present invention enables remote certification in a distributed environment.

DETAILED DESCRIPTION OF THE INVENTION

Figure 1:
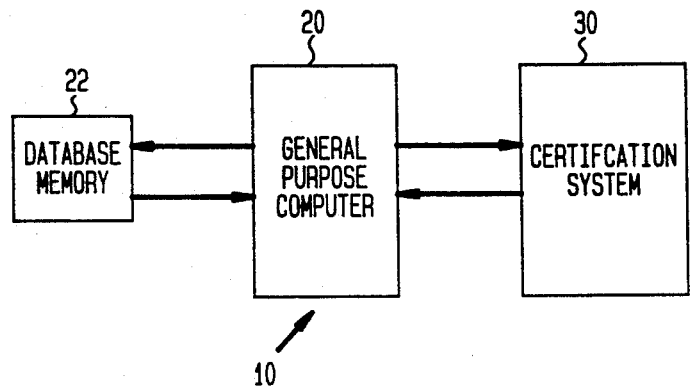
FIG. 1 schematically illustrates a database transaction processing system including a certification system for performing optimistic concurrency control certification functions.

A database transaction processing system is illustrated in FIG. 1. As shown in FIG. 1, the database transaction processing system 10 comprises a general purpose computer 20 for executing transactions comprising database operations performed on one or more databases stored in a memory 22. A certification system 30 is connected to the general purpose computer 20 for performing optimistic concurrency control certification functions.

Certification requests are transmitted from the general purpose computer 20 to the certification system 30. The certification requests comprise read-sets, and write-sets associated with transactions running on the general purpose computer 20. These read-sets and write-sets are passed from the general purpose computer 20 to the certification system 30 at transaction commit time. Following the performance of the certification operations for a specific transaction, the certification system 30 returns to the general purpose computer 20 an indication that 1) the certification was successful and the write-set of the specific transaction can be applied to the database stored in the memory 22, 2) the read-set certification was successful, or 3) the certification failed.

Figure 2:
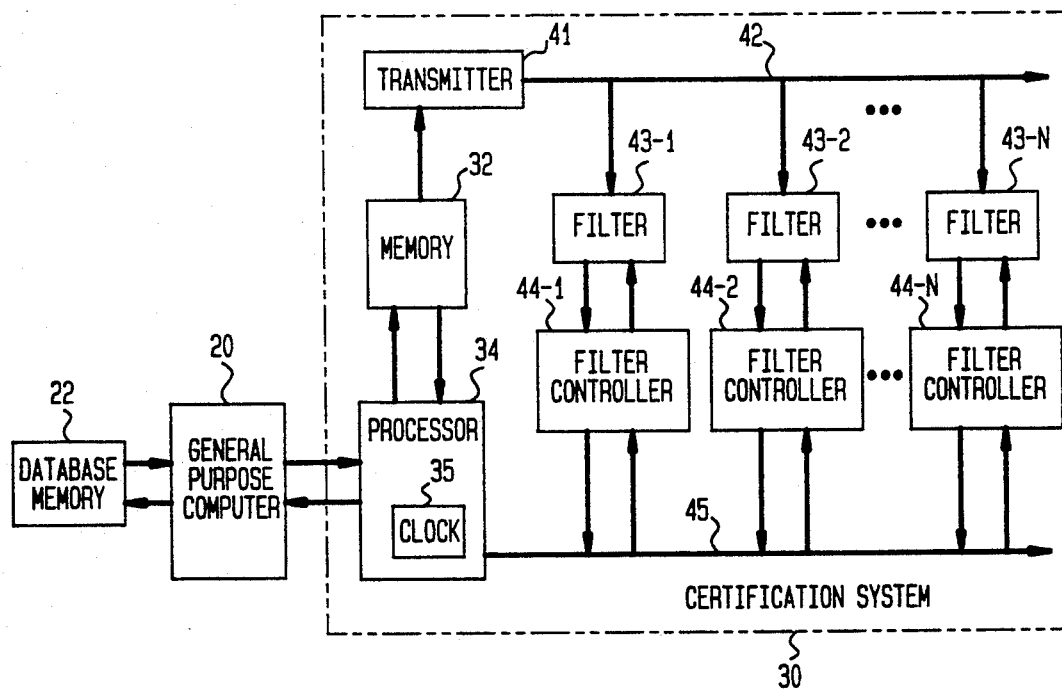
FIG. 2 schematically illustrates one embodiment of a certification system for use in the database transaction processing system of FIG. 1.

One embodiment of the certification system 30 is shown in FIG. 2. The certification system 30 comprises the memory 32 and a processor 34 with read and write access to the memory 32. Typically, the memory 32 stores data in the form of one or more relations. The transmitter 41 cyclically broadcasts data stored in the memory 32 via the downstream communications channel 42. A set of filters 43-1, 43-2, . . . , 43-N interface with the communications channel 42 and "listen" to the cyclically broadcast bit stream transmitted via the channel 42. Each of the filters 43-1, 43-2, . . . , 43-N is controlled by a filter controller 44-1, 44-2, . . . , 44-N. The filter controllers 44 serve to load instructions such as selection operations received from the certification system processor 34 via channel 45. In response to such instructions, the filters 43 select certain data from the cyclically broadcast bit stream on channel 42. When the bit stream comprises one or more relations, the filters select from the bit stream certain tuples or records in response to the instructions. The data selected by the filter 43 from the broadcast bit stream is received at the corresponding filter controller 44 and may be transmitted back to the certification system processor 34 via the channel 45.

Certification requests are received by the certification processor 34 from the general purpose processor 20. These certification requests comprise the read-sets and write-sets associated with transactions. These read-sets and write-sets are passed from the general purpose processor 20 to the certification processor 34 at transaction commit time. As indicated previously, following certification of the specific transaction, the certification processor 34 returns status information to the general purpose computer 20 indicating that 1) the certification was successful and that the write-set of the specific transaction can be applied to the database; 2) the read-set certification was successful; or 3) the certification failed.

To carry out certification requests, the certification memory system 32 stores a log containing the database activity associated with all the update transactions executed by the general purpose computer 20 on the database stored in the memory 22 since the time the oldest transaction which can possibly affect the outcome began. Illustratively, the log comprises three relations named HISTORY, ACCEPTED, and PENDING. These relations may be described as follows.

HISTORY: This relation contains the read-sets and write-sets associated with committed transactions that have been applied by the general purpose computer 20 to the database stored in the memory 22.

ACCEPTED: This relation contains the log of read-sets and write-sets that have been previously certified but whose write-sets are not yet applied to the database stored in the memory 22.

PENDING: This relation contains the log of read-sets and write-sets that have not been accepted but represent requests for certification.

In a particular embodiment of the invention, the log of database activity comprises the concatenation of the HISTORY, ACCEPTED and PENDING relations as described above.

The contents of the log are cyclically broadcast by the transmitter 41 over the communications channel 42

The certification system 30 of FIG. 2 carries out a certification request as follows:

1. At a time $t_1$, a specific transaction running on the general purpose computer's 20 initiates a commit and requests certification by transmitting to the certification system processor 34 tuples that define the specific transaction's read-set and/or tuples that define the specific transaction's write-set.

2. At a second time $t_2$, the read-set and write-set of the specific transaction are added by the processor 34 to the PENDING relation in the memory 32.

3. At a time $t_3$, predicates representing the read-set of the specific transaction or unique identifiers representing the individual tuples in the read-set are transmitted via the channel 45 from the certification processor 34 to a particular filter controller 44 and loaded as instructions in the particular filter 43 associated with the particular filter controller 44. Unique identifiers for tuples in the write-set of the specific transaction are also transmitted from the processor 34 to the particular filter controller 44 and loaded as instructions into the particular filter 43.

4. Between a time $t_4$ and a time $t_5$, the log stored in the memory 32 is broadcast over the channel 42. The particular filter 43 observes a complete cycle of tuples in the log. The particular filter 43 will select tuples from the relations comprising the log during this broadcast cycle. This is because the particular filter 43 will always select from the broadcast bit stream the specific transaction's own read-set and write-set. Should additional tuples from another transaction be selected from the broadcast bit stream by the particular filter 43, a conflict has been detected. The conflicting tuples are transmitted by the particular filter controller 44 back to the certification system processor 34. The certification processor 34 then executes a conventional serial equivalency determination algorithm on the conflicting transactions. If the transactions are unacceptable, the general purpose computer 20 will be notified by the processor 34 to abort the specific transaction. If an abort occurs, the aborted transaction's read-set and write-set are deleted by the processor 34 from the PENDING relation in the memory 32 to avoid unnecessary aborts of subsequent transactions. At time $t_5$ the previously described instructions are removed from the particular filter 43.

5. Assuming no conflict has been detected, at a time $t_6$, the specific transaction's read-set and write-set will be moved to the ACCEPTED relation in the memory 32 under the control of the processor 34 and deleted from the PENDING relation.

6. At a time $t_7$ the certification system processor 34 notifies the general purpose computer 20 that the specific transaction's write-set can be applied to the database stored in the memory 22. At a time $t_8$, following notification that the write-sets were applied, the ACCEPTED relation in the memory 32 is reset to null by the processor 34. At this time, the ACCEPTED read-set and write-set are also moved to the HISTORY relation in the memory 32 under the control of the processor 34.

7. Finally, the transaction running in the computer 20 is notified that the commit is complete with either a successful or failed status.

Periodically, the general purpose computer 20 notifies the certification system processor 34 of the timestamp of the start time of the oldest transaction in the general purpose computer 20 that can affect the outcome of certifications. The certification system processor 34 then deletes all read-sets and write-sets in the HISTORY relation in the memory 32 belonging to transactions that committed prior to the time-stamp. This process is done only to improve the efficiency of the certification process by reducing the size of the log. It can be carried out at any time following the notification by the general purpose computer 20.

There is an alternative certification process that can be carried out by the certification system 30 which requires significantly less information to be retained in the log stored in the memory 32. This certification process aborts some number of transactions unnecessarily, but does successfully maintain consistency of the database stored in the memory 22 and of multiple read-sets in long running transactions.

As indicated above, there are three tests that determine if a transaction $T_i$ can be successfully certified against a transaction $T_j$: 1) $T_j$ completes its write-set before $T_i$ performs its first select; 2) $T_i$ starts its write-phase after $T_j$ completes its write phase, and the read-set of $T_i$ has no common items with the write-set of $T_j$; and 3) both the read-set and the write-set of $T_i$ have no items in common with the write-set of $T_j$, and $T_j$ completes its read phase before $T_i$ completes its read phase. If any one of these conditions is true, there is no conflict between transactions $T_i$ and $T_j$. If none of the above conditions hold, the certification process of transaction $T_i$ fails.

In the alternative certification process, the three tests are reduced to two, specifically: 1) $T_j$ completes is write-set before $T_i$ performs its first select; and 2) $T_i$ starts its write-phase after $T_j$ completes its write phase, and the read-set of $T_i$ has no common items with the write-set of $T_j$. The third test described above has been eliminated. Since certification is successful if either of the two rules is true, cases where the third rule would have been true will now result in a failed certification. The advantage of this approach is that only the write-sets of transactions need to be maintained in the log stored in the memory 32 of FIG. 2. This significantly reduces the amount of data contained in the log and significantly improves the response time of the filter and filter controller systems 43, 44 because the broadcast cycles of the log via communications channel 44 are significantly shorter.

In this case, the second step (2) in the seven-step certification process described above is modified so that only the write-sets are added by the processor 34 to the PENDING relation stored in the memory 32. Otherwise the certification process remains the same.

It is an advantage of the present invention that two types of conflict detection are possible, predicate based or record based. With predicate based conflict detection, a transaction's read-set is represented by the set of select predicates issued by the transaction. With record based conflict detection, a transaction's read-set is represented by a unique identifier for each record read by the transaction's selection predicates. Record-based conflict detection provides less protection against conflicts since it does not allow detection of conflicts with newly created records; whereas, predicate type conflict detection does. However, the computational cost of performing predicate level conflict detection has been prohibitive. The present invention allows both types of conflict detection in a highly efficient manner.

The basic primitive instructions utilized by the filters 43 for conflict detection are tuple-to-tuple comparisons and predicate-to-tuple comparisons. As previously explained, conflict detection requires checking for tuples common to the read and write-sets of different interleaved transactions. Because write-sets are expressed in the log as tuples, detecting conflicts between write-sets requires the tuple-to-tuple comparison primitive. Because read-sets may be expressed as either predicates or tuples, depending on the choice of conflict detection type, detecting conflicts between the read and write-sets of interleaved transactions requires either the tuple-to-tuple primitive or the predicative-to-tuple primitive.

As indicated above, detection is carried out by broadcasting the log of accepted and pending transactions over the channel 42 to the data filters 43 which are loaded with instructions derived by the processor 34 from the committing transactions' read-sets and write-sets. The derivation of the instructions for the filters 43 by the processor 34 from the read an write-sets received from the computer 20 is straightforward. The read and write-sets comprise tuples with unique IDs. Read-set and write-set tuples may be converted by the processor 34 into predicates for selecting tuples based on the unique IDs. Alternatively, read-set predicates may be used without conversion. In all cases, the predicates used for conflict detection are augmented with time stamp information generated by a clock 35 associated with the processor 34 of FIG. 2 so that only interleaved transactions are considered.

It is a further advantage of the present invention that several filters 43 can be loaded with certification requests in parallel to increase the rate of certification processing. There are two advantages to this approach: 1) it scales to high rates of certification, and 2) it performs predicate based certifications efficiently.

In addition, when the log is cyclically broadcast over a long distance high speed communications medium such as optic fiber, the present invention allows for remote certification in a distributed environment.

Figure 3:
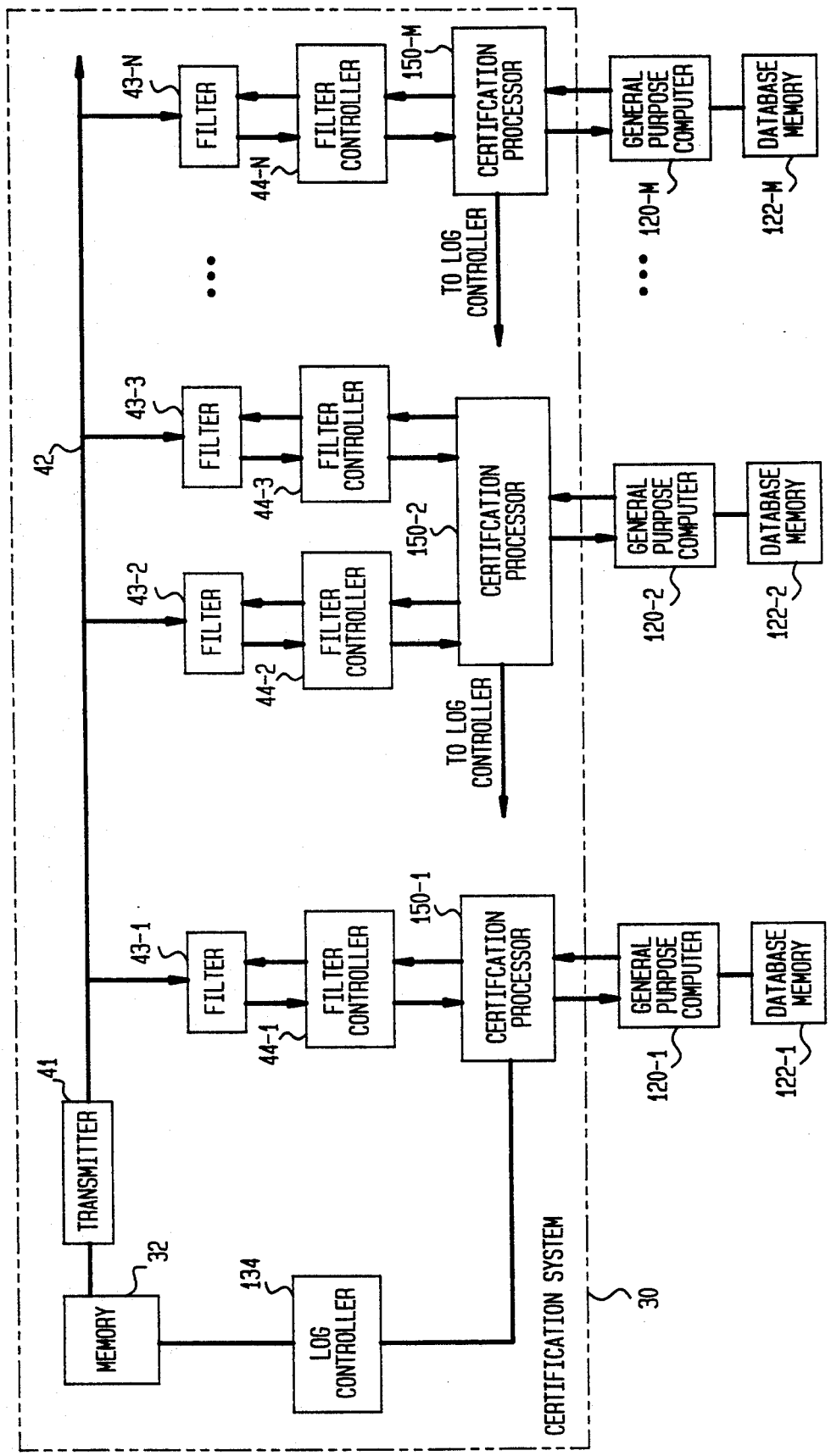
FIG. 3 schematically illustrates a second embodiment of a certification system for use in the database transaction processing system of FIG. 1.

FIG. 3 illustrates an alternative certification system 30' which provides certification functions for a distributed processing system. In FIG. 3, a plurality of general purpose computers 120-1, 120-2, ..., 120-M each carry out database transactions on the databases stored in the associated memories 122-1, 122-2, ..., 122-M. The certification system 30, serves to perform certification functions for the computers 120-1, 120-2, ..., 120-M. The certification system 30' comprises a memory 32 which maintains a log of the read-sets and write-sets of the active transactions running on the general purpose computers 120-1, 120-2, ..., 120-M. As indicated previously, this log comprises the HISTORY, ACCEPTED, and PENDING relations. Tuples are written into and deleted from these relations by the log controller 134.

Read-sets and write-sets of transactions to be certified are transmitted by the general purpose computers 120-1, 120-2, ..., 120-M to the corresponding certification processors 150-1, 150-2, ..., 150-M. The certification processors transmit these read-sets and write-sets to the log controller 134 so that they can be added to the log maintained in the memory 32.

To perform conflict detection, the processors 150-1, 150-2, ..., 150-M transmit instructions in the form of selection criteria to the corresponding filters 43-1, 43-2 ... 43-N by way of the corresponding filter controllers 44-1, 44-2, ..., 44-N.

The contents of the log in the memory 32 is cyclically broadcast by the transmitter 41 over the channel 42. During a broadcast cycle of the log, each filter 43 selects from the broadcast bit stream tuples which match its selection criteria. As indicated previously, if tuples from other than a specific transaction's own read-set or write-set are detected by a filter, a conflict is indicated.

Finally, the above-described embodiments of the invention are intended to be illustrative only. Numerous alternative embodiments of the invention may be devised by those skilled in the art without departing from the spirit and scope of the following claims.

We claim:

1. In a database transaction certification system for a database transaction processing system, said certification system having a memory, a plurality of filters connected to said memory by a communications channel, each of said filters having a filter controller, and processor means connected to said memory and connected to said filter controllers, a method for determining in parallel possible multiple conflicts, each conflict being between a specific transaction and one or more other transactions whose execution overlaps the execution of said specific transaction, said method comprising the steps of storing in said memory a log comprising the read-sets and write-sets of said other transactions, said log comprising history, accepted, and pending relations, where said history relation contains read-sets and write-sets that have been previously applied to the database due to previously completed transactions, where said accepted relation contains read-sets and write-sets that have not been applied to the database but are due to previously certified transactions, and where said pending relation contains read-sets and write-sets that have not been applied to the database and are due to transactions awaiting certification, writing from said processor means into said log in said memory a read-set and a write-set of said specific transaction, transmitting from said processor means to one of said filter controllers selection criteria for the one filter associated with said one filter controller identifying the read-set and write-set of said specific transaction, broadcasting over said communications channel said log comprising data items which include the read-sets and write-sets of said other transactions and the read-set and write-set of said specific transaction, utilizing said one filter to identify in said broadcast log data items meeting said selection criteria identifying said read-set and write-set of said specific transaction, and determining if a conflict exists by determining if said one filter identifies data items from said broadcast log in addition to the read-set and write-set of said specific transaction.

2. The method of claim 1 wherein said filters perform predicated selection or comparison operations on said log broadcast via said communications channel.

3. The method of claim 1 wherein said read-set and write-set of said specific transaction are generated by a general purpose computer which executes said specific database transaction.

4. The method of claim 3 wherein said method further comprises the steps of
- if a conflict exists, executing on a certification processor a serial equivalency determination algorithm to determine if the conflict is acceptable, and
- if said conflict is unacceptable, communicating from said certification processor to said general purpose computer to abort said specific transaction.

5. In a database transaction certification system for a database transaction processing system, said certification system having a memory, a plurality of filters connected to said memory by a communications channel, a processor connected to said memory, and filter control means connecting said filters to said processor, a method for determining in parallel possible multiple conflicts, each conflict being between a specific transaction and one or more other transactions whose execution overlaps the execution of the specific transaction, said method comprising the steps of
- storing in said memory a log comprising the history, accepted, and pending relations of the read-sets and write-sets of said other transactions, where said history relation contains read-sets and write-sets that have been previously applied to the database due to previously completed transactions, where said accepted relation contains read-sets and write-sets that have not been applied to the database but are due to previously certified transactions, and where said pending relation contains read-sets and write-sets that have not been applied to the database and are due to transactions awaiting certification,
- transmitting via said filter control means to a filter which interfaces with said communications channel selection criteria identifying a read-set and a write-set of said specific transaction,
- broadcasting said log comprising data items which include said write-sets of said other transactions over said communications channel, whereby said communications channel can transmit said log to remote locations to enable distributed certification,
- utilizing said filter to identify in said broadcast log data items meeting said selection criteria, and
- determining the existence of a conflict based on any data items identified by said filter.

6. The method of claim 5 wherein said method further comprises writing into said memory said write-set of said specific transaction.

7. A database transaction processing system comprising
- a computer for executing database transactions, and
- a certification system comprising
- a memory for storing a log comprising read-sets and write-sets of overlapping transactions executing on said computer,
- a plurality of certification processors connected to said memory and in communication with said computer for receiving certification requests from said computer in the form of read-sets and write-sets of said transactions and for adding said received certification requests to said log in said memory,
- a transmitter connected to said memory for cyclically broadcasting said log in said memory over a communications channel, whereby said communications channel can transmit said log to remote locations to enable distributed certifications,
- a plurality of filters interfacing said communications channel, and
- means for transmitting from said certification processors particular selection criteria relating to read-sets and write-sets of at least one of said transactions to each of a corresponding particular one of said filters, said filters identifying data items in said log broadcast over said channel in response to said selection criteria to determine in parallel if there are conflicts between said transactions based upon data items identified by said filters.

8. A database transaction processing system comprising
- a computer for executing database transactions, and
- a certification system comprising
- a memory for storing a log of the history, accepted, and pending relations comprising write-sets of overlapping transactions executing on said computer,
- a plurality of certification processors connected to said memory and in communication with said computer for receiving certification requests from said computer in the form of read-sets and write-sets of said transactions and for adding the write-sets of said received certification request to said log in said memory,
- a transmitter connected to said memory for cyclically broadcasting said log in said memory over a communications channel, whereby said communications channel can transmit said log to remote locations to enable distributed certification, and
- a plurality of filters for interfacing said communications channel, said certification processors transmitting particular selection criteria relating to the read-sets and write sets of at least one of said transactions to each of a corresponding one of said filters, said filters identifying data items in said log broadcast over said channel in response to said selection criteria to determine in parallel if there are conflicts between said transactions based upon data items identified by said filters.

* * * * *